US008290921B2

(12) United States Patent
Liu et al.

(10) Patent No.: US 8,290,921 B2
(45) Date of Patent: Oct. 16, 2012

(54) IDENTIFICATION OF SIMILAR QUERIES BASED ON OVERALL AND PARTIAL SIMILARITY OF TIME SERIES

(75) Inventors: Ning Liu, Beijing (CN); Jun Yan, Beijing (CN); Benyu Zhang, Beijing (CN); Zheng Chen, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 529 days.

(21) Appl. No.: 11/770,505

(22) Filed: Jun. 28, 2007

(65) Prior Publication Data
US 2009/0006365 A1   Jan. 1, 2009

(51) Int. Cl.
G06F 7/00 (2006.01)
G06F 17/30 (2006.01)
(52) U.S. Cl. ......................................... 707/705; 707/725
(58) Field of Classification Search ........................ None
See application file for complete search history.

(56) References Cited

U.S. PATENT DOCUMENTS

| | | | |
|---|---|---|---|
| 5,544,049 A | | 8/1996 | Henderson et al. |
| 5,603,024 A | * | 2/1997 | Goldring ........................ 707/203 |
| 5,732,260 A | * | 3/1998 | Nomiyama ............................ 1/1 |
| 5,734,893 A | * | 3/1998 | Li et al. ................................ 707/4 |
| 5,940,825 A | | 8/1999 | Castelli et al. |
| 6,286,005 B1 | * | 9/2001 | Cannon ........................ 455/2.01 |
| 6,411,950 B1 | | 6/2002 | Moricz et al. |
| 6,421,675 B1 | | 7/2002 | Ryan et al. |
| 6,446,060 B1 | | 9/2002 | Bergman et al. |
| 6,470,307 B1 | * | 10/2002 | Turney ................................ 704/9 |
| 6,473,753 B1 | * | 10/2002 | Katariya et al. .................... 707/4 |
| 6,496,817 B1 | | 12/2002 | Whang et al. |
| 6,606,417 B1 | * | 8/2003 | Brechner ....................... 382/240 |
| 6,650,998 B1 | | 11/2003 | Rutledge et al. |
| 6,732,088 B1 | | 5/2004 | Glance |
| 6,745,178 B1 | | 6/2004 | Emens et al. |
| 6,778,981 B2 | | 8/2004 | Lee et al. |
| 6,785,672 B1 | * | 8/2004 | Floratos et al. .................... 707/3 |
| 6,832,218 B1 | | 12/2004 | Emens et al. |
| 7,016,892 B1 | | 3/2006 | Kokkonen et al. |
| 7,051,023 B2 | | 5/2006 | Kapur et al. |
| 7,082,428 B1 | | 7/2006 | Denny et al. |
| 7,149,732 B2 | | 12/2006 | Wen et al. |

(Continued)

OTHER PUBLICATIONS

Conference'04, Search-Query Trend Analysis with Internal- and External- Correlation, Copyright 2004, ACM 1-58113-000-0/00/0004, pp. 1-9.*

(Continued)

*Primary Examiner* — Wilson Lee
*Assistant Examiner* — Jessica N Le
(74) *Attorney, Agent, or Firm* — Perkins Coie LLP

(57) ABSTRACT

Techniques for identifying similar queries based on their overall similarity and partial similarity of time series of frequencies of the queries are provided. To identify queries that are similar to a target query, the query analysis system generates, for each query, an overall similarity score for that query and the target query based on the time series of the query and the target query. The query analysis system also generates, for each query, partial similarity scores for the query and the target query based on various time sub-series of the overall time series of the queries. The query analysis system then identifies queries as being similar to the target query based on the overall similarity scores and the partial similarity scores of the queries.

15 Claims, 6 Drawing Sheets

U.S. PATENT DOCUMENTS

| | | | |
|---|---|---|---|
| 7,158,966 | B2 | 1/2007 | Brill et al. |
| 7,562,076 | B2* | 7/2009 | Kapur .................................. 1/1 |
| 7,739,254 | B1* | 6/2010 | Osinga .......................... 707/705 |
| 7,752,190 | B2* | 7/2010 | Skinner ......................... 707/706 |
| 7,885,849 | B2* | 2/2011 | Gross .................................. 1/1 |
| 2002/0004735 | A1* | 1/2002 | Gross ............................. 705/10 |
| 2002/0059258 | A1* | 5/2002 | Kirkpatrick .................. 707/100 |
| 2002/0184212 | A1* | 12/2002 | Ugai et al. ......................... 707/6 |
| 2004/0002973 | A1* | 1/2004 | Chaudhuri et al. ................ 707/7 |
| 2004/0172240 | A1* | 9/2004 | Crockett et al. .............. 704/205 |
| 2004/0193612 | A1* | 9/2004 | Chang ............................ 707/10 |
| 2004/0243392 | A1* | 12/2004 | Chino et al. ...................... 704/7 |
| 2004/0249713 | A1* | 12/2004 | Gross ............................. 705/14 |
| 2005/0050033 | A1* | 3/2005 | Thomas et al. .................. 707/3 |
| 2005/0102259 | A1 | 5/2005 | Kapur |
| 2005/0144065 | A1* | 6/2005 | Calabria et al. ................ 705/14 |
| 2005/0198056 | A1* | 9/2005 | Dumais et al. ................ 707/101 |
| 2005/0198068 | A1 | 9/2005 | Mukherjee et al. |
| 2005/0234877 | A1 | 10/2005 | Yu |
| 2006/0053136 | A1* | 3/2006 | Ashiri .......................... 707/101 |
| 2006/0117003 | A1 | 6/2006 | Ortega et al. |
| 2006/0173830 | A1* | 8/2006 | Smyth et al. ...................... 707/3 |
| 2006/0224356 | A1 | 10/2006 | Castelli et al. |
| 2006/0248068 | A1* | 11/2006 | Chien et al. ...................... 707/4 |
| 2006/0257018 | A1* | 11/2006 | Shi et al. ........................ 382/159 |
| 2007/0043706 | A1 | 2/2007 | Burke et al. |
| 2007/0067267 | A1 | 3/2007 | Ives |
| 2007/0067283 | A1 | 3/2007 | Sengupta |
| 2007/0094247 | A1* | 4/2007 | Chowdhury et al. ............. 707/4 |
| 2007/0097755 | A1 | 5/2007 | Marndi et al. |
| 2007/0112764 | A1 | 5/2007 | Yih et al. |
| 2007/0121674 | A1 | 5/2007 | Chen et al. |
| 2007/0143278 | A1 | 6/2007 | Srivastava et al. |
| 2007/0143300 | A1 | 6/2007 | Gulli et al. |
| 2007/0203894 | A1* | 8/2007 | Jones et al. ....................... 707/3 |
| 2008/0133503 | A1* | 6/2008 | Popescul et al. ................. 707/5 |
| 2008/0144124 | A1* | 6/2008 | Samadani et al. ............ 358/453 |
| 2008/0154877 | A1* | 6/2008 | Joshi et al. ....................... 707/5 |
| 2008/0183685 | A1* | 7/2008 | He et al. ........................... 707/4 |
| 2009/0006002 | A1* | 1/2009 | Honisch et al. ................. 702/20 |
| 2009/0086755 | A1* | 4/2009 | Chen et al. .................... 370/468 |
| 2009/0144226 | A1* | 6/2009 | Tateno ............................ 707/1 |
| 2009/0161570 | A1* | 6/2009 | Duffield et al. .............. 370/252 |
| 2010/0153107 | A1* | 6/2010 | Kawai .......................... 704/240 |
| 2011/0010263 | A1* | 1/2011 | Skinner ........................ 705/26.3 |
| 2011/0161331 | A1* | 6/2011 | Chung et al. ................ 707/751 |

OTHER PUBLICATIONS

Beitzel et al., Temporal Analysis of a Very Large Topically Categorized Web Query Log, Nov. 22, 2006, Wiley InterScience, vol. 58 Issue 2, pp. 166-178, http://www3.interscience.wiley.com/journal.*

Chan, Kin P., Efficient Time Series Matching by Wavelets, IEEE, Jun. 1999, pp. 1-117.*

Keogh et al., Dimensionality Reduction for Fast Similarity Search in Large Time Series Databases, Springer-Verlag, 1999, pp. 1-19.*

Popivanov et al., Similarity Search Over Time-Series Data Using Wavelets, IEEE, 1998, Edition 18, pp. 212-214 (or re-numbered as 1-10).*

Chien, Steve and Immorlica, Nicole, "Semantic Similarity Between Search Engine Queries Using Temporal Correlation," WWW 2005, May 10, 2005 (10 pages).

Vlachos, Michail et al., "Identifying Similarities, Periodicities and Bursts for Online Search Queries," SIGMOD 2004, Jun. 13-18, 2004 (12 pages).

ABFALG, Joannes et al., "Similarity Search on Time Series Based on Threshold Queries," 2006 (18 pages).

Pratt, Kevin B., "Locating Patterns in Discrete Time-Series," May 2001.

Caraca-Valente, Juan P. and Lopez-Chavarrias, Ignacio, "Discovering Similar Patterns in Time Series," KDD 2000, Boston, MA, Copyright ACM 2000 (9 pages).

"Search-Query Trend Analysis with Internal- and External- Correlation", *Conference '04*. Copyright 2004 ACM 1-58113-000-0/00/0004.

Baza-Yates, et al. "Query Recommendation using Query Logs in Search Engines", *Workshop in Web.*

U.S. Appl. No. 11/770,462, filed Jun. 28, 2007, Liu, et al.
U.S. Appl. No. 11/770,445, filed Jun. 28, 2007, Liu, et al.
U.S. Appl. No. 11/770,423, filed Jun. 28, 2007, Liu, et al.
U.S. Appl. No. 11/770,385, filed Jun. 28, 2007, Liu, et al.
U.S. Appl. No. 11/770,358, filed Jun. 28, 2007, Liu, et al.
U.S. Appl. No. 11/770,307, filed Jun. 28, 2007, Liu, et al.

*Clustering*, Greece, 2004. Current Trends in Database Technology—EDBT 2004 Workshops, LNCS 3268, Springer.

Capobianco, Enrico. "Multiscale Analysis of Stock Index Return Volatility", *Computational Economics*, Apr. 2004 vol. 23, Issue 3, pp. 219-237.

Ghysels, Eric. "Time-series model with periodic stochastic regime switching", *Macroeconomic Dynamics* (2000), 4: pp. 467-486.

Granger. "Investigating Casual Relations by Econometric Models and Cross-spectral Methods", *Econometrics*, vol. 27, No. 3, pp. 424-438, Aug. 1969.

Guralnik, et al. "Event Detection from Time Series Data", Presented at *Proceedings of the Fifth International Conference on Knowledge Discovery and Data Mining (KDD)*, San Diego, California, USA, pp. 33-42, 1999.

Joachims. "Optimizing Search Engines using Clickthrough Data", *SIGKDD* 02, Edmonton, Alberta, Canada. Copyright 2002 ACM 1-5811-567-X/02/0007.

Keogh, et al. "Dimensionality Reduction for Fast Similarity Search in Large Time Series Databases" KAIS Long paper submitted May 16, 2000. 3 (3). 263-286.

Keogh, et al. "Finding Surprising Patterns in a Time Series Database in Linear Time and Space", *Proceedings SIGKDD* 2002, Jul. 23-26, 2002, Edmonton, Alberta, Canada, pp. 550-556.

Lau, et al. "Patterns of Search: Analyzing and Modeling Web Query Refinement", *Proceedings of the Seventh International Conference on User Modeling*, Banff, Canada, pp. 119-128. Year of Publication: 1999/ ISBN:3-211-83151-7.

Liu, et al. "Semantic Overall and Partial Similarity of Temporal Query Logs", 2006 IEEE International Conference on Data Mining, Dec. 18-22, 2006, Hong Kong. Microsoft Research Asia, Beijing.

Liu, et al. "Similarity of Temporal Query Logs Based on ARIMA Model", Sixth International Conference on Data Mining, Dec. 2006 pp. 975-979. Digital Object Identifier 10.1109/ICDM.2006.144.

Sims. "Money, Income, and Causality", The American Economic Review, vol. 62, No. 4, pp. 540-552, Sep. 1972.

Sun, et al. "Casual Relation of Queries from Temporal Logs", WWW 2007, May 8-12, 2007, Banff, Alberta, Canada. ACM 978-1-59593-654-7/07/0005.

Vlachos, et al. "Fast Burst Correlation of Financial Data", Presented at 9th European Conference of Practices in Knowledge and Data Discovery (PKDD), Porto, Portugal, pp. 268-379, 2005.

Wen, et al. "Query Clustering Using User Logs", ACM Transactions on Information Systems (TOIS), vol. 20, No. 1, Jan. 2002, pp. 59-81.

Wen-tau, et al. "Finding Advertising Keywords on Web Pages", Proceedings of the 15th International Conference on World Wide Web (WWW 2006), May 23-26, 2006, Edinburgh, Scotland, 10 pages.

Xia, et al. "Indexing and Querying Constantly Evolving Data Using Time Series Analysis", 2005 (12 pages).

Zaiane, et al. "Finding Similar Queries to Satisfy Searches Based on Query Traces", OOIS Workshops 2002: 207-216.

Chatfield, Christopher, "The Analysis of Time Series," Boca Raton, 6th ed., 2004, pp. 107-109, 111, 112. Avaliable at http://books.google.com. [last accessed Jun. 4, 2009].

Zhao et al., "Time-Dependent Semantic Similarity Measure of Queries Using Historical Click-Through Data," IN: WWW 2006, Edinburgh, Scotland (2006). Available at ACM.

Groschwitz and Polyzos, "A Time Series Model of Long-Term NSFNET Backbone Traffic," In: Proceedings of the IEEE Int'l Conference on Communication (1994). Available at http://citeseerx, ist.psu.edu/viewdoc/summary?doi=10.1.1.45.7322 [last accessed Jun. 18, 2009].

Sang and Li, "A Predictability Analysis of Network Traffic," In: Proceedings of IEEE INFOCOM.2000. Available at http://citeseerx.ist.psu.edu/viewdocs/summary?doi=10.1.1.41.4537 last accessed [Jun. 18, 2009].

"AFL Draws," University of Melbourne Statistical Consulting Centre. last modified: 2005. Available at www.scc.ms.unimelb.edu.au/whatisstatistics/afldraws.html [last accessed Jun. 8, 2009].

Kage and Sumiya, "A Web Search Method Based on the Temporal Relation of Query Keywords," WISE 2006 (2006). Available at Springer-Link.

Vlachos et al., "Fast burst correlation of Financial Data," available at Springer-Link.

Yamauchi and Mukaidono, "Probabilistic Inference and Bayseian Theorem based on Logical Implication," 1999. Available at Springer-Link.

Zushi et al., "A Vector space Retrieval Method with Causal Relationship Computation Functions for Event Data," In: Proceedings for the 2005 Symposium on Applications and the Internet Workshops (2005). Available at IEEE.

"Multiple Regression," by StatSoft, Inc. Available at http://www.statsoft.com/textbook/stmulreg.html. Retrieved fromt he Wayback Machine at http://web.archive.org.web/20050101-20050201re_/ http://www.statsoft.com/textbook/stmulreg.html [last retrieved on Jun. 10, 2009].

* cited by examiner

IDENTIFICATION OF SIMILAR QUERIES BASED ON OVERALL AND PARTIAL SIMILARITY OF TIME SERIES

BACKGROUND

Many search engine services, such as Google and Yahoo, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service identifies web pages that may be related to the search request based on how well the keywords of a web page match the words of the query. The search engine service then displays to the user links to the identified web pages in an order that is based on a ranking that may be determined by their relevance to the query, popularity, importance, and/or some other measure.

Search engine services obtain revenue by placing advertisements along with search results. These paid-for advertisements are commonly referred to as "sponsored links," "sponsored matches," or "paid-for search results." An advertiser who wants to place an advertisement (e.g., a link to their web page) along with certain search results provides a search engine service with an advertisement and one or more bid terms. When a search request is received, the search engine service identifies the advertisements whose bid terms match the terms of the search request. The search engine service then selects advertisements to display based on the closeness of their match, the amount of money that the advertisers are willing to pay for placing the advertisement, and other factors. The search engine service then adds a sponsored link to the search result that points to a web page of the advertiser. The search engine services typically either charge for placement of each advertisement along with search results (i.e., cost per impression) or charge only when a user actually selects a link associated with an advertisement (i.e., cost per click).

Advertisers would like to maximize the effectiveness of their advertising dollars used to pay for advertisements. Thus, advertisers try to identify bid term, advertisement, and bid amount combinations that result in the highest benefits (e.g., most profit) to the advertiser. Advertisers may analyze query trends to identify bid terms, timing for placing advertisements based on those bid terms, bid amounts for those bid terms, and so on. Query trend analysis studies how the frequency of queries changes over time and is used to predict the future frequency of queries. If query trends can be accurately predicted, then advertisers can adjust their placement of advertisements in an attempt to maximize the advertising effectiveness. For example, if a query is likely to increase in the near future, an advertiser may want to increase the bid amount for terms of that query. Query trend analysis may also be used to identify queries that are similar in the sense that their query trends are similar. Insight gained from analysis of similar queries can be used to select bid terms for advertising, to augment search results, to provide query suggestions, to identify products to recommend, and so on.

SUMMARY

Techniques for identifying similar queries based on their overall similarity and partial similarity of time series of frequencies of the queries are provided. A query analysis system represents each query as a time series of frequencies at which the query was submitted to a search engine service. To identify queries that are similar to a target query, the query analysis system generates, for each query, an overall similarity score for that query and the target query based on the time series of the query and the target query. The query analysis system also generates, for each query, partial similarity scores for the query and the target query based on various time sub-series of the overall time series of the queries. The query analysis system then identifies queries as being similar to the target query based on the overall similarity scores and the partial similarity scores of the queries. The query analysis system may select the queries with the highest overall similarity scores or partial similarity scores as being most similar.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
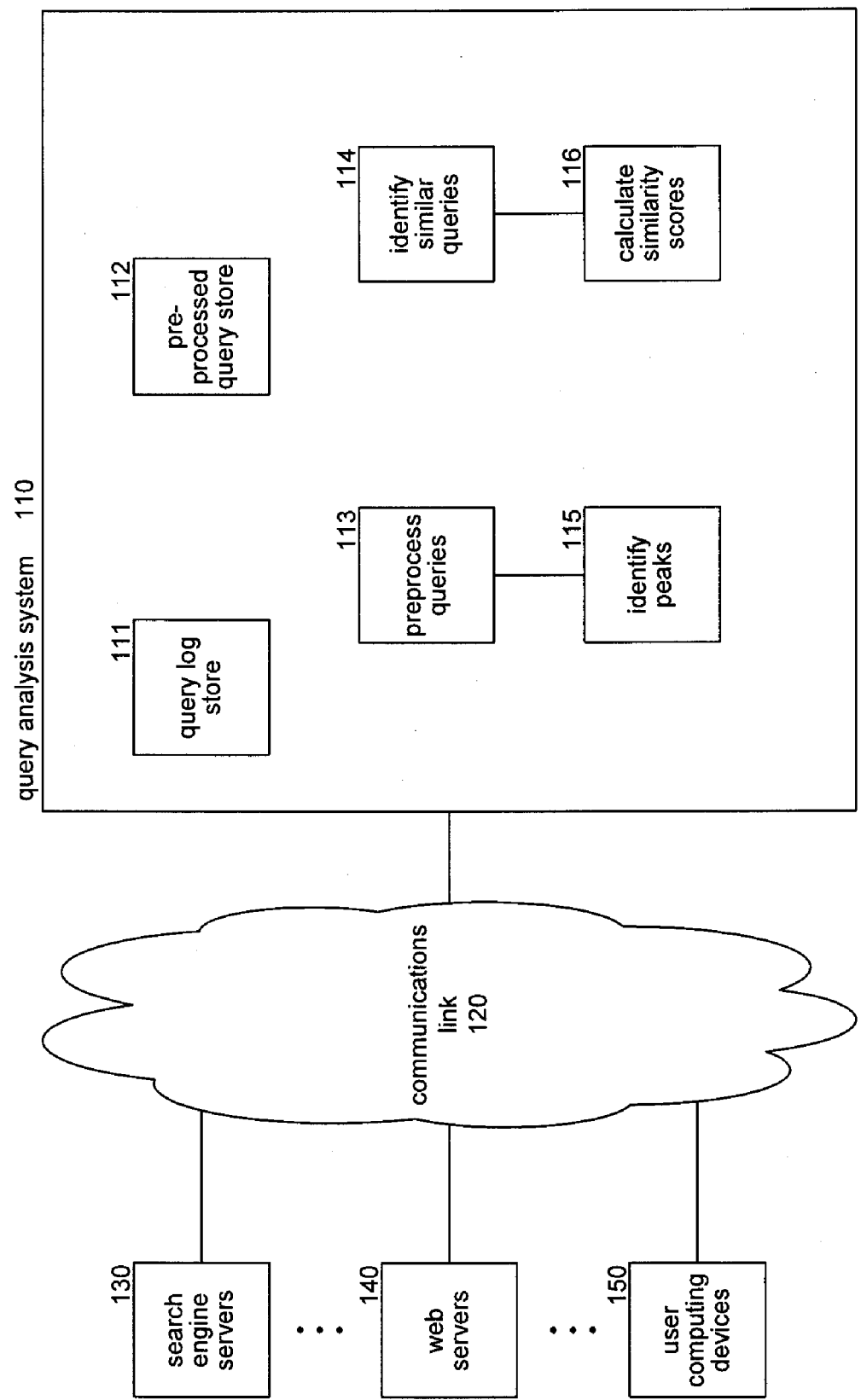
FIG. 1 is a block diagram that illustrates components of a query analysis system in some embodiments.

Techniques for identifying similar queries based on their overall similarity and partial similarity of time series of frequencies of the queries are provided. In some embodiments, a query analysis system represents each query as a time series of frequencies at which the query was submitted to a search engine service. The query analysis system may extract the count or frequency of queries from a query log for an interval (e.g., a day). The query analysis system represents each query Q by a time series $Q=\{q_1, q_2, \ldots, q_N\}$, where N is the length of the time series and $q_i$ is the query frequency on the ith interval. One skilled in the art will appreciate that the interval may be a day, more than a day (e.g., two days or seven days), or less than a day (e.g., 12 hours), depending on the goals of the query analysis system. To identify queries that are similar to a target query, the query analysis system generates, for each query, an overall similarity score for that query and the target query based on the time series of the query and the target query. For example, the query analysis system may apply a cosine similarity metric, a Euclidean distance metric, a correlation metric, or some other metric to generate an overall similarity score indicating the similarity between two queries. The query analysis system also generates, for each query, partial similarity scores for the query and the target query based on various time sub-series of the overall time series of the queries. For example, if the overall time series has 365 intervals representing the days of a year, then there may be 12 time sub-series, each corresponding to the intervals within a month. The first 31 intervals (e.g., the first time sub-series) represent January, the next 28 intervals (e.g., the second time sub-series) represent February, and so on. The query analysis system may use the same metric or different metrics to calculate the overall similarity scores and the partial similarity scores. The query analysis system then identifies queries as being similar to the target query based on the overall similarity scores and the partial similarity scores of the queries. The query analysis system may, for each query, combine its overall similarity score and its partial similarity scores to give a combined similarity score indicating the similarity of that query to the target query. In some embodiments, the query analysis system may select the queries with the highest overall similarity scores or partial similarity scores. For example, the query analysis system may sort the queries based on their similarity scores (overall and partial) and then indicate that the queries ranked highest are similar to the target query.

In some embodiments, the query analysis system may calculate partial similarity scores for a target query and another query for only those time sub-series for which the target query and the other query both have peaks in their frequencies. A peak represents an interval of a time sub-series in which the frequency satisfies a peak criterion. A peak criterion may be that, during an interval of the time sub-series, a frequency is a certain percentage higher than the average frequency of that time sub-series, a frequency is one or more standard deviations above the mean frequency of the time series, and so on. For example, a peak may be defined as a frequency that is higher than three standard deviations above the mean frequency of the time series assuming a Gaussian distribution of the frequencies. Since time sub-series without peaks are likely to be similar, the partial similarity score for those time sub-series may not be particularly indicative of similar queries. For example, since the queries "Christmas" and "Easter" will likely have similar frequency trends in the month of July (i.e., both flat), a partial similarity score for July may incorrectly indicate that the queries are similar. To prevent such incorrect indications, the query analysis system may calculate partial similarity scores only for the time sub-series in which both the target query and the other query have peaks. The query analysis system may effectively set to zero the partial similarity scores for time sub-series in which either the target query or the other query or both do not have peaks. If the target query has a peak in a time sub-series and the other query does not, the calculated partial similarity score would likely be relatively low. The query analysis system may represent the mean of a time series as follows:

$$m = \frac{1}{n}\sum_{i=1}^{n} x_i$$

where $X=\{x_1, x_2, \ldots, x_n\}$ represents a time series with n intervals, $x_i$ represents the frequency during the ith interval, and m represents the mean. The query analysis system may also represent the standard deviation as follows:

$$\sigma = \left(\frac{1}{n}\sum_{i=1}^{n}(x_i - m)^2\right)^{1/2}$$

where $\sigma$ represents a standard deviation. The query analysis system may consider a time sub-series to contain a peak only if the peak criterion is satisfied for some interval within the time sub-series as follows:

$$x_i > m + \alpha\sigma$$

where $\alpha$ represents a parameter to control the frequency that qualifies as a peak.

In some embodiments, the query analysis system generates a representation of the time series of each query with a reduced dimensionality. For example, a time series for a year may be reduced from 365 intervals to approximately 50 coefficients. The query analysis system may use a Haar Wavelet Transform ("HWT") to generate the time series with reduced dimensionality. (See, Struzik, Z. and Siebes, A., "The Haar Wavelet Transform in the Time Series Similarity Paradigm," PKDD, 1999, p. 12-22.)

In some embodiments, the query analysis system may normalize frequencies of the time series using a z-statistics normalization as follows:

$$\hat{x}_i = \frac{x_i - m}{\sigma} \quad i = 1, 2, \cdots, n.$$

Because of this normalization, the inner product of two normalized time series is a special case of a correlation metric for a similarity score. (See, Chien, S. and Immorlica, N., "Semantic Similarity Between Search Engine Queries Using Temporal Correlation," Proceedings of the 14th Intl. Conf. on World Wide Web, Chiba, Japan, 2005, pp. 2-11.)

FIG. 1 is a block diagram that illustrates components of a query analysis system in some embodiments. The query analysis system 110 may be connected to search engine servers 130, web servers 140, and user computing devices 150 via communications link 120. The query analysis system may obtain query logs from the search engine servers. The search engine servers crawl the web servers to index web pages, receive queries from user computing devices, and provide an indication of matching web pages as search results for the queries. The query analysis system may include a query log store 111 and a preprocessed query store 112. The query log store may contain an entry for each query that was submitted by a user to a search engine server along with the frequency of submission for each time interval. The preprocessed query store may contain an entry for each query with a representation of the query with a reduced dimensionality and with an indication of whether the query has a peak during each time sub-series. The query analysis system also includes a preprocess queries component 113, an identify similar queries component 114, an identify peaks component 115, and a calculate similarity scores component 116. The preprocess queries component generates the representations of the queries with the reduced dimensionality and invokes the identify peaks component to identify the frequency peaks within the time sub-series. The identify similar queries component invokes the calculate similarity scores component to calculate, for each query, the overall similarity score and the partial similarity scores for that query and a target query. The identify similar queries component may then select the queries with the top overall or partial similarity scores. The identify similar queries component may normalize the overall similarity scores to be in a range of 0 to 1 and may separately normalize the partial similarity scores for each time sub-series so that the similarity scores can be compared.

The computing device on which the query analysis system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the query analysis system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in and used with various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The query analysis system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. In addition, the functions of the query analysis may be performed offline. For example, the query analysis system may periodically generate a new preprocess query store based on recent additions to the query logs. Also, the preprocessing of the query logs may be performed by computing devices separate from computing devices that identify similar queries.

Figure 2:
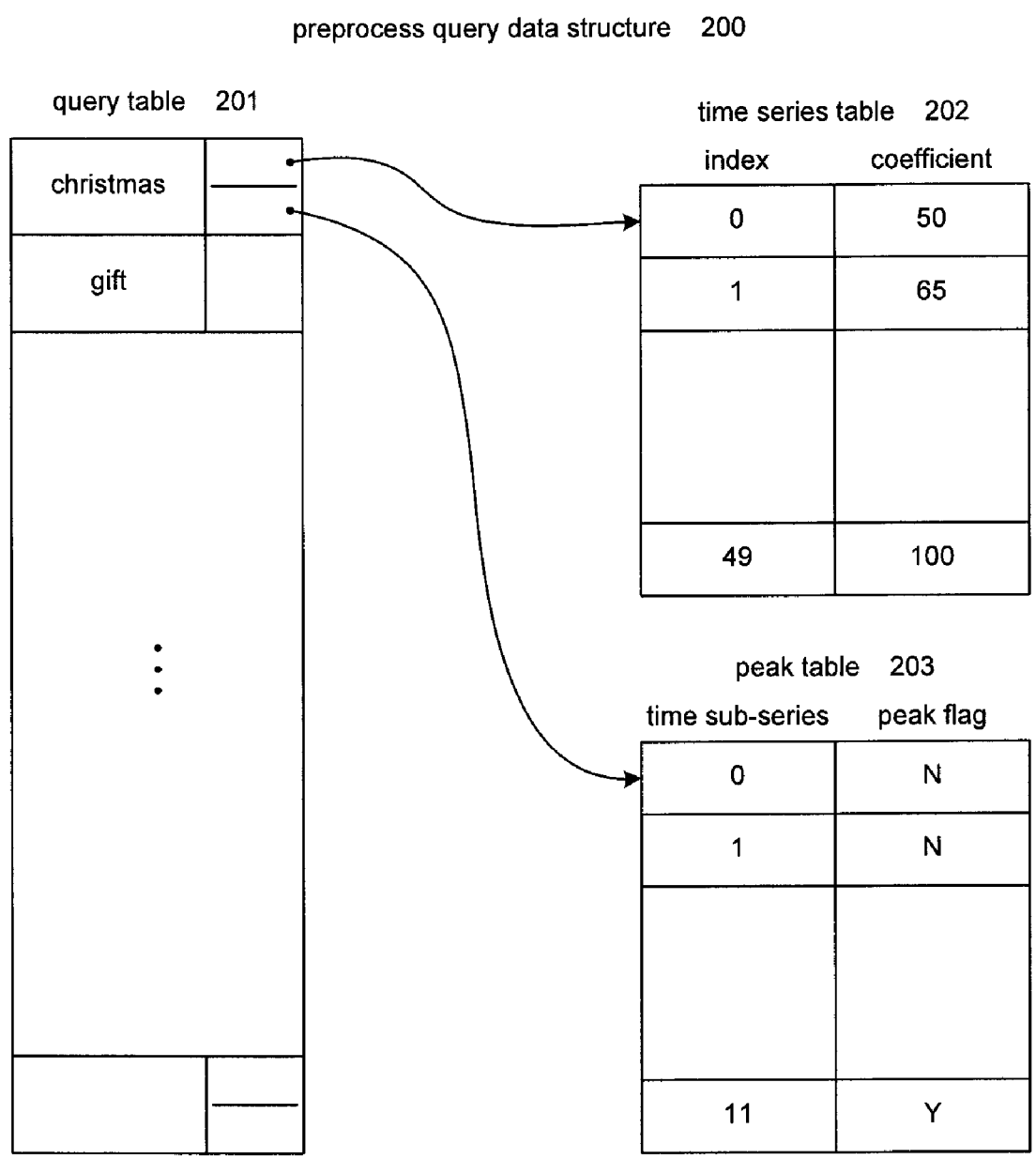
FIG. 2 is a block diagram that illustrates a logical layout of a preprocess query data structure in some embodiments.

FIG. 2 is a block diagram that illustrates a logical layout of a preprocess query data structure in some embodiments. A preprocess query data structure 200 includes a query table 201 with an entry for each query of the query log store. Each entry identifies the query and includes a reference to a time series table 202 and a peak table 203. Each time series table includes an entry for each coefficient of the representation of the reduced dimensionality. Each peak table includes an entry for each time sub-series along with an indication of whether the time sub-series for that query includes a frequency peak.

Figure 3:
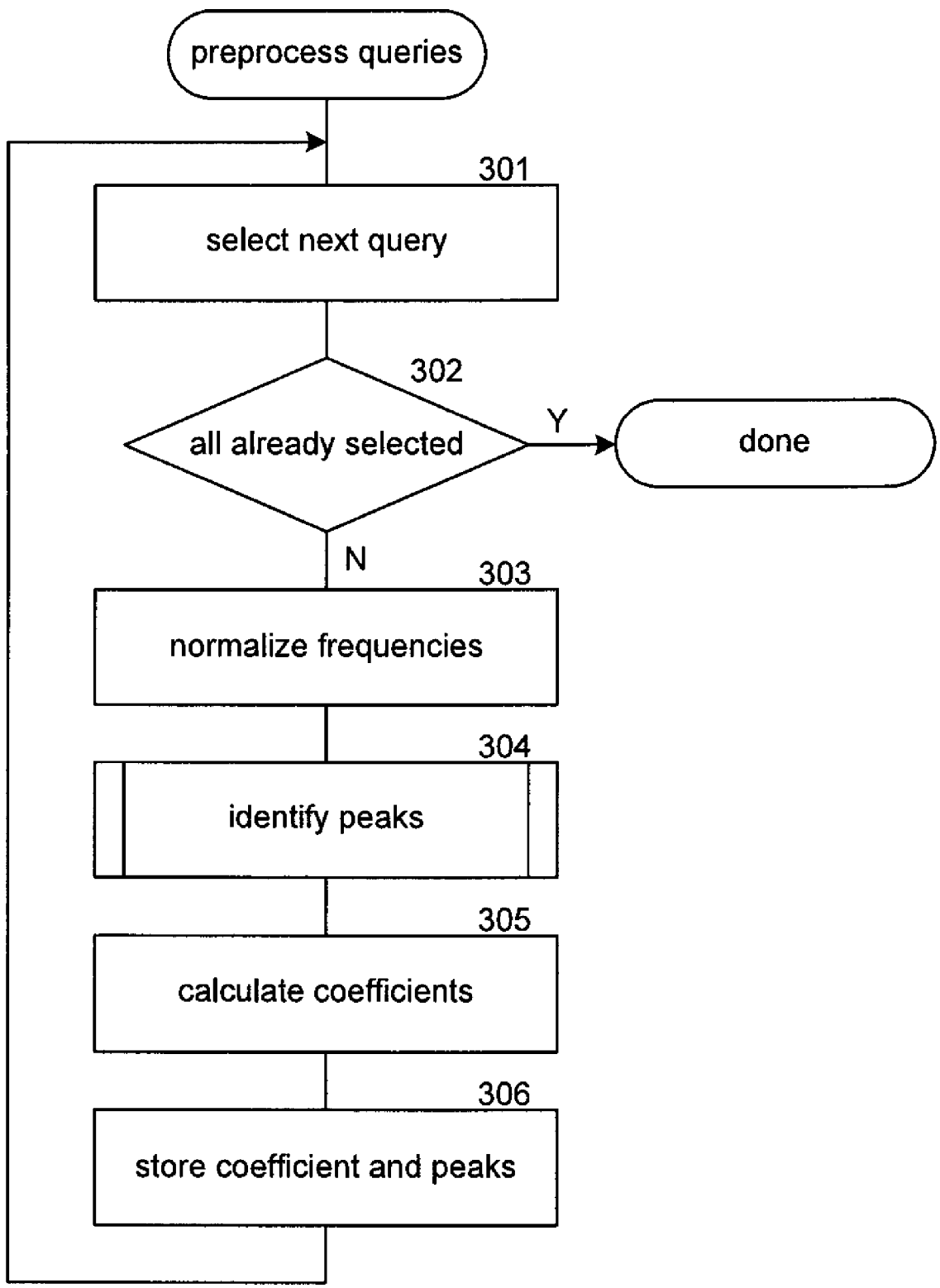
FIG. 3 is a flow diagram that illustrates the processing of a preprocess queries component of the query analysis system in some embodiments.

FIG. 3 is a flow diagram that illustrates the processing of the preprocess queries component of the query analysis system in some embodiments. The component preprocesses the query log to generate the coefficients for the representation of reduced dimensionality and to identify peaks. In block 301, the component selects the next query of the query log. In decision block 302, if all the queries have already been selected, then the component completes, else the component continues at block 303. In block 303, the component normalizes the frequencies of the selected query (e.g., a z-statistics normalization). In block 304, the component invokes the identify peaks component to identify the peaks within the time sub-series for the selected query. In block 305, the component calculates the coefficients for the representation of reduced dimensionality by, for example, applying a multi-resolution HWT. The component may calculate coefficients for the overall time series and calculate coefficients for each time sub-series that includes a peak. The coefficients for the time sub-series can then be used to calculate the partial similarity scores. One skilled in the art will appreciate that the calculating of coefficients is performed to reduce the dimensionality of the representation of a time series or time sub-series. In block 306, the component stores the coefficients and an indication of the peaks in the preprocess query store and then loops to block 301 to select the next query.

Figure 4:
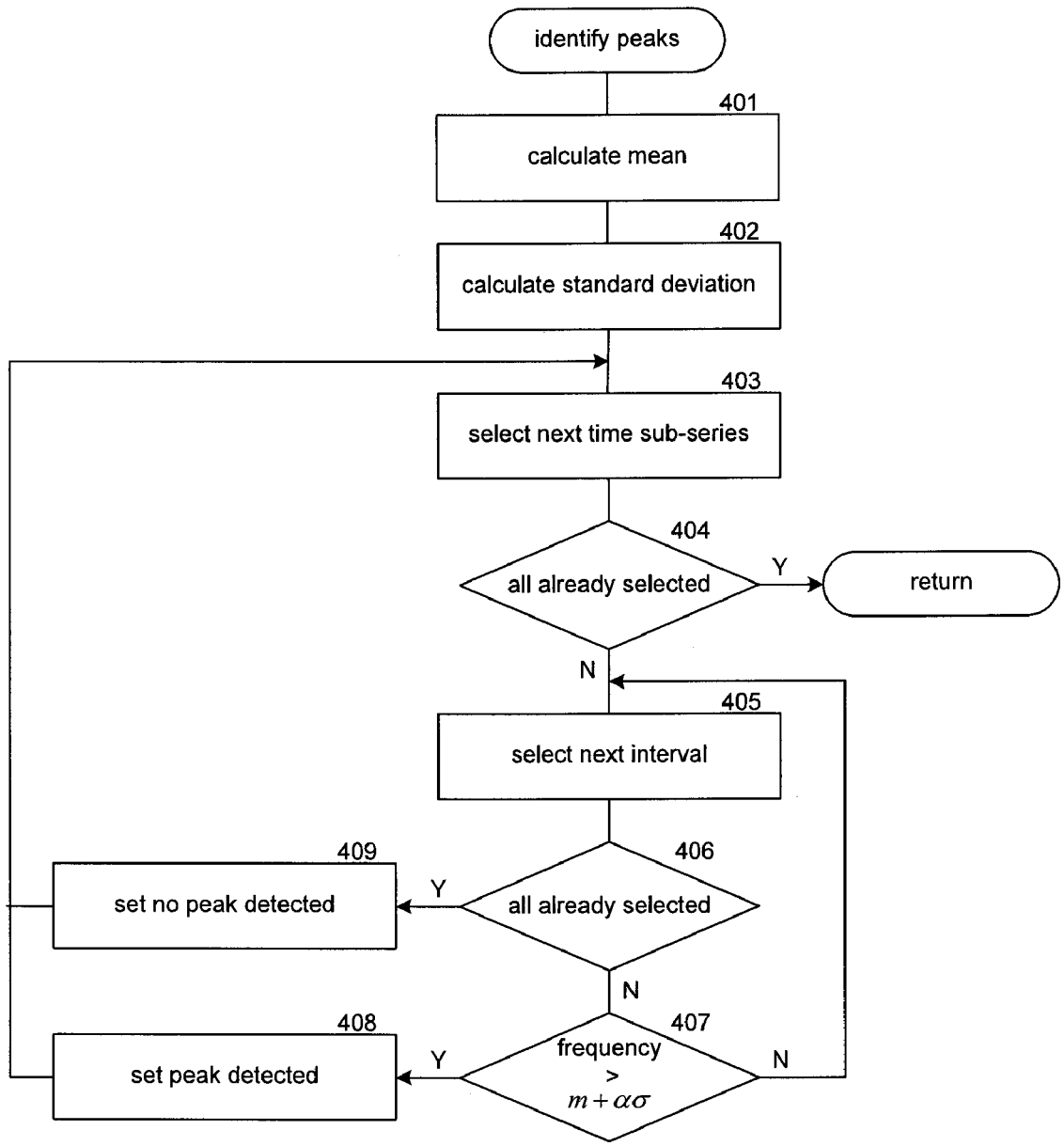
FIG. 4 is a flow diagram that illustrates the processing of an identify peaks component of the query analysis system in some embodiments.

FIG. 4 is a flow diagram that illustrates the processing of the identify peaks component of the query analysis system in some embodiments. The component is passed a query and identifies whether each time sub-series within the time series for that query has a frequency that satisfies the peak criterion. In block 401, the component calculates the mean of the frequencies of the time series. In block 402, the component calculates a standard deviation of the frequencies of the time series. In blocks 403-409, the component loops determining whether each time sub-series includes a frequency peak. In block 403, the component selects the next time sub-series. In decision block 404, if all the time sub-series have already been selected, then the component returns, else the component continues at block 405. In blocks 405-407, the component loops determining whether each interval within the selected time sub-series has a frequency that satisfies the peak criterion. In block 405, the component selects the next interval within the selected time sub-series. In decision block 406, if all the intervals have already been selected, then no peak was detected within the time sub-series and the component continues at block 409, else the component continues at block 407. In decision block 407, if the frequency of the selected intervals satisfies a peak criterion, then the component continues at block 408, else the component loops to block 405 to select the next interval. In block 408, the component indicates that a peak has been detected and then loops to block 403 to select the next time sub-series. In block 409, the component indicates that no peak has been detected and then loops to block 403 to select the next time sub-series.

Figure 5:
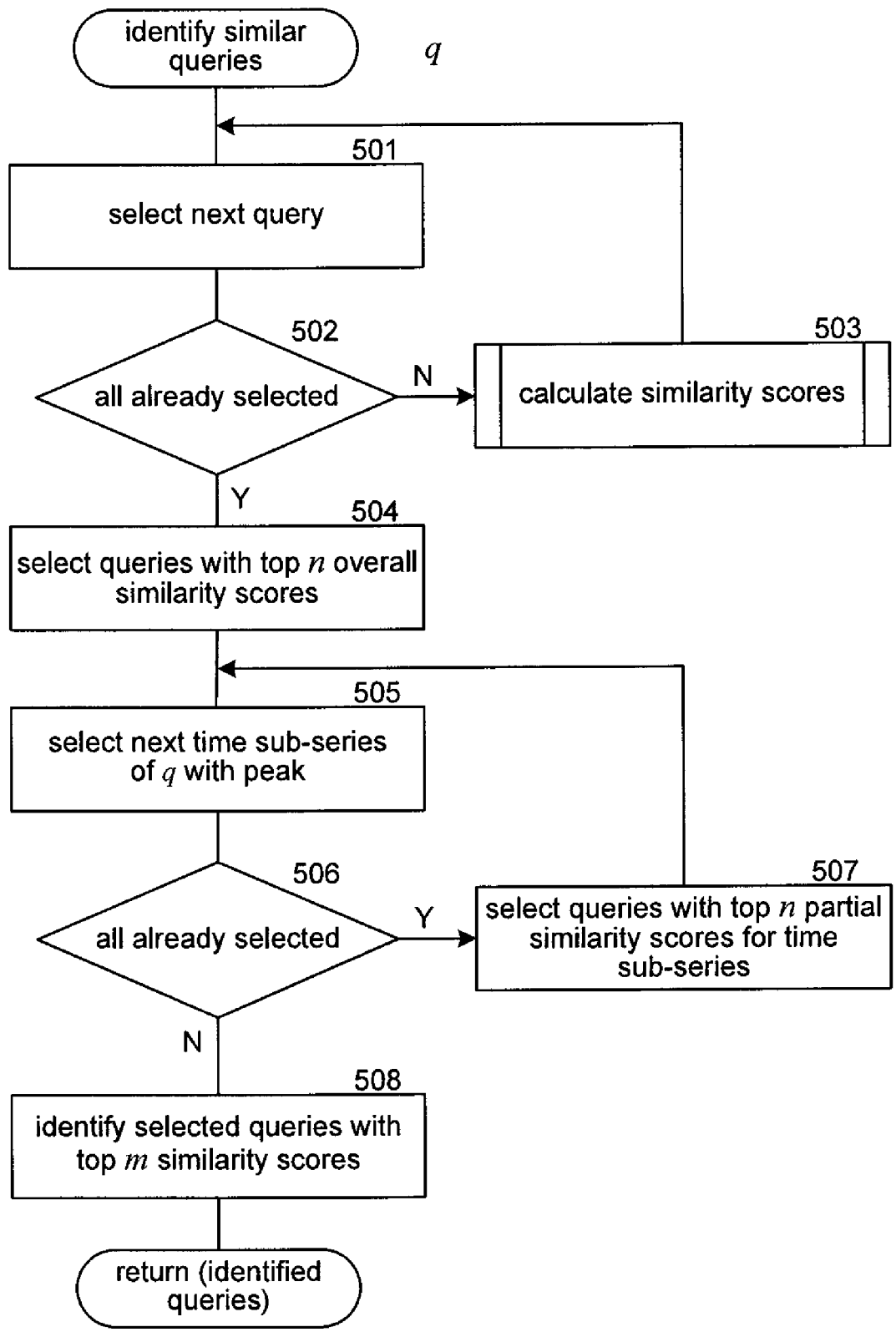
FIG. 5 is a flow diagram that illustrates the processing of an identify similar queries component of the query analysis system in some embodiments.

FIG. 5 is a flow diagram that illustrates the processing of the identify similar queries component of the query analysis system in some embodiments. The component is passed a target query and identifies queries whose overall similarity and/or partial similarity is greatest. The component may be invoked in real time to identify similar queries or may be invoked offline to identify similar queries and store the results for use in real time. In blocks 501-503, the component loops calculating the overall similarity scores and partial similarity scores for each query and the target query. In block 501, the component selects the next query. In decision block 502, if all the queries have already been selected, then the component continues at block 504, else the component continues at block 503. In block 503, the component invokes the calculate similarity scores component to calculate the overall and partial similarity scores for the selected query and the target query and then loops to block 501 to select the next query. In block 504, the component selects a number (e.g., variable or fixed) of queries with the highest overall similarity scores. In blocks 505-507, the component loops selecting the queries based on their partial similarity scores. In block 505, the component selects the next time sub-series of the target query that includes a peak. In decision block 506, if all the time sub-series of the target query that include a peak have already been selected, then the component continues at block 507, else the component continues at block 508. In block 507, the component selects a number of queries with the highest partial similarity scores for the selected time sub-series. The component then loops to block 505 to select the next time sub-series. In block 508, the component identifies which of the selected queries, of those that were selected because they have a high overall similarity score or a high partial similarity score for a time sub-series, have the highest similarity scores. The component then returns the identified queries as being most similar to the target query.

Figure 6:
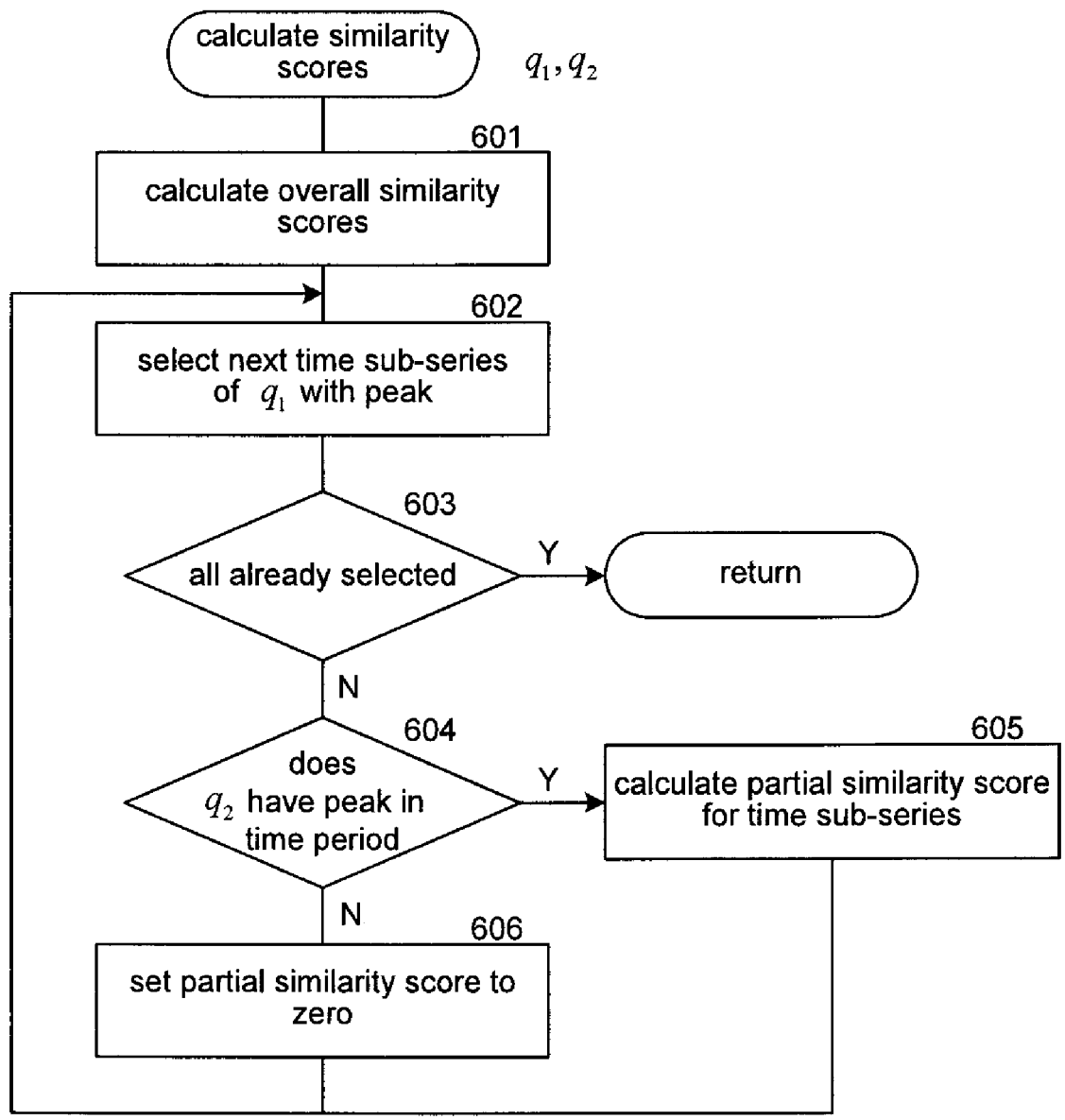
FIG. 6 is a flow diagram that illustrates the processing of a calculate similarity scores component of the query analysis system in some embodiments.

FIG. 6 is a flow diagram that illustrates the processing of the calculate similarity scores component of the query analysis system in some embodiments. The component is passed a target query and another query and calculates an overall similarity score and a partial similarity score for each time sub-series for which both queries have a peak. In block 601, the component calculates the overall similarity score of the queries. In blocks 602-606, the component loops calculating the partial similarity scores. In block 602, the component selects the next time sub-series of the target query with a peak. In decision block 603, if all such time sub-series have already been selected, then the component returns, else the component continues at block 604. In decision block 604, if the other query has a peak within the selected time sub-series, then the component continues at block 605, else the component continues at block 606. In block 605, the component calculates the partial similarity score for the selected time sub-series and loops to block 602 to select the next time sub-series. In block 606, the component sets the partial similarity score for the selected time sub-series to zero or another minimum frequency score and then loops to block 602 to select the next time sub-series.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the query analysis may generate a combined similarity score as a weighted sum of the overall similarity score and the partial similarity scores. The query analysis system may learn the weights for the overall and partial similarity scores using training data and any appropriate well-known machine learning technique (e.g., linear regression). One skilled in the art will appreciate that the term "high or highest similarity scores" refers to scores indicating high or highest similarity between queries. For example, with some similarity metrics a score of 0 may indicate highest similarity and a score of 1 may indicate lowest similarity. Accordingly, the invention is not limited except as by the appended claims.

We claim:

1. A method in a computing device for identifying queries that are similar to a target query, the method comprising:
   for each query, storing frequencies at which users submitted the query during intervals, the frequencies of the intervals representing a time series of frequencies for the query;
   calculating a mean of the frequencies for the target query;
   for each of the queries,
      calculating, by a computing processor, an overall similarity score between the query and the target query based on the frequencies of the query and the target query of the time series;
      calculating a mean of the frequencies for the query; and
      for each of a plurality of time sub-series of the time series for the query, when the time sub-series for the query includes a frequency peak that satisfies a peak criterion based on the calculated mean of the frequencies for the query and the time sub-series for the target query includes a frequency peak that satisfies a peak criterion based on the calculated mean of the frequencies for the target query, calculating, by the computing processor, a partial similarity score between the query and the target query for the time sub-series based on the frequencies of the query and the target query for the time sub-series; and
   identifying queries that are similar to the target query based on the overall similarity scores and only those partial similarity scores of the queries for which the target query and the queries both have frequency peaks.

2. The method of claim 1, wherein the identifying includes selecting queries with highest scores of the overall similarity scores or of the partial similarity scores.

3. The method of claim 2, further including normalizing the overall similarity scores and the partial similarity scores.

4. The method of claim 1, wherein the overall similarity scores and the partial similarity scores are based on a cosine similarity of the frequencies.

5. The method of claim 1, including generating representations with reduced dimensionality of the frequencies of the queries and wherein the overall similarity scores are calculated from the generated representations.

6. The method of claim 5, wherein the generating of the representations includes applying a Haar Wavelet Transform.

7. The method of claim 1, wherein the overall similarity score and the partial similarity scores for each query are combined to generate a combined similarity score for the query.

8. A computer-readable storage medium storing instructions that are executed by a computing device to identify queries that are similar to a target query, the instructions for performing a method comprising:
   for each query, storing frequencies at which users submitted the query during intervals, the frequencies of the intervals representing a time series of frequencies for the query;
   calculating a mean of the frequencies for the target query; and
   for each of the queries,
      calculating, by a computing processor, an overall similarity score between the query and the target query based on analysis of time series of frequencies for the query and the target query; and
      for each of a plurality of time sub-series of the time series,
         when the time sub-series for the query includes a frequency peak that satisfies a peak criterion based on the calculated mean of the frequencies for the query and the time sub-series for the target query includes a frequency peak that satisfies a peak criterion based on the calculated mean of the frequencies for the target query, calculating, by the computing processor, a partial similarity score between the query and the target query based on analysis of frequencies for the time sub-series;
   selecting queries with highest scores of the overall similarity scores;
   for each of the time sub-series in which the target query has a frequency peak, selecting queries with highest scores of the partial similarity scores for that time sub-series such that only queries are selected that have a frequency peak within the time sub-series; and identifying the selected queries as being similar to the target query based on the overall similarity score and partial similarity scores of the selected queries.

9. The computer-readable storage medium of claim 8, further including normalizing the overall similarity scores and the partial similarity scores.

10. The computer-readable storage medium of claim 8, wherein the frequency peak occurs when a frequency during the time sub-series is larger than the mean of the frequencies by one or more standard deviations.

11. The computer-readable storage medium of claim 8, wherein the overall similarity scores and partial similarity scores are based on a cosine similarity of the frequencies.

12. The computer-readable storage medium of claim 8, further including generating representations with reduced dimensionality of the frequencies of the queries and wherein the similarity scores are calculated from the generated representations.

13. The computer-readable storage medium of claim 8, including selecting keywords for advertisement placement based on the identified similar queries.

14. A computing system for identifying queries that are similar to a target query, the system comprising:
a query log store having, for each query, a time series of frequencies for the query, the times series representing the number of times that the query was submitted by users to a search engine during time intervals;
a preprocess query store having, for each query, a representation of the time series of the query with a reduced dimensionality and an indication of time sub-series of the query that have frequency peaks that satisfy a peak criterion based on a mean of the frequencies for the query;
a memory storing computer-executable instructions of
a preprocess queries component that generates the representations with reduced dimensionality and identifies the time sub-series with frequency peaks; and
an identify similar queries component that identifies queries similar to the target query based on overall similarity of the queries to the target query and partial similarity of the queries to the target query, the partial similarity being based on similarity only during time sub-series for which the target query and the queries have frequency peaks, a frequency peak for time sub-series of the target query satisfies a peak criterion based on a mean of the frequencies for the target query; and
a processor for executing the computer-executable instructions stored in the memory.

15. The computing system of claim 14, wherein the identify similar queries component selects as similar queries those queries with highest scores of the overall or partial similarity scores.

* * * * *